(12) United States Patent
Chinnakkonda Vidyapoornachary et al.

(10) Patent No.: US 9,760,504 B2
(45) Date of Patent: *Sep. 12, 2017

(54) NONVOLATILE MEMORY DATA SECURITY

(71) Applicant: International Business Machines Corporation, Armonk, NY (US)

(72) Inventors: Diyanesh B. Chinnakkonda Vidyapoornachary, Bangalore (IN); Stephen P. Glancy, Poughkeepsie, NY (US); Hillery C. Hunter, Chappaqua, NY (US); Charles A. Kilmer, Essex Junction, VT (US); Kyu-hyoun Kim, Chappaqua, NY (US); Warren E. Maule, Cedar Park, TX (US); Vipin Patel, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,558

(22) Filed: Sep. 29, 2015

(65) Prior Publication Data

US 2017/0060782 A1   Mar. 2, 2017

Related U.S. Application Data

(63) Continuation of application No. 14/841,787, filed on Sep. 1, 2015.

(51) Int. Cl.
*G06F 12/00* (2006.01)
*G06F 12/14* (2006.01)
(Continued)

(52) U.S. Cl.
CPC ........ *G06F 12/1466* (2013.01); *G06F 3/0622* (2013.01); *G06F 3/0637* (2013.01);
(Continued)

(58) Field of Classification Search
CPC .. G06F 12/1466; G06F 3/0622; G06F 3/0673; G06F 2212/1052; G06F 3/0637
See application file for complete search history.

(56) References Cited

U.S. PATENT DOCUMENTS 8,218,770 B2   7/2012   Arulambalam et al.
8,850,150 B2   9/2014   Ramezani
(Continued)

OTHER PUBLICATIONS

Anonymous, "Method and System for an Optimized Secure Erase of Data on Non-Volatile Data Storage Devices," IP.com No. 000205100, IP.com Electronic Publication: Mar. 15, 2011, 4 pages.

(Continued)

*Primary Examiner* — Charles Rones
*Assistant Examiner* — Nanci Wong
(74) *Attorney, Agent, or Firm* — Scott S. Dobson

(57) ABSTRACT

Keys are generated at a memory device with a period of time elapsing between generation of each key. A request is received from a memory controller for the most recently generated key. The memory device communicates the first key to the memory controller. Access to nonvolatile memory on the memory device is locked. An unlock command with a second key is received from the memory controller. The memory device determines that the second key matches the first key and unlocks access to the nonvolatile memory in response.

12 Claims, 10 Drawing Sheets

(51) Int. Cl.
  *G06F 12/02* (2006.01)
  *G06F 3/06* (2006.01)
  *G06F 21/88* (2013.01)

(52) U.S. Cl.
  CPC ........ *G06F 3/0673* (2013.01); *G06F 12/0246* (2013.01); *G06F 21/88* (2013.01); *G06F 2212/1052* (2013.01); *G06F 2212/7209* (2013.01)

(56) References Cited

U.S. PATENT DOCUMENTS

| | | | |
|---|---|---|---|
| 8,880,900 B2 | 11/2014 | Jang et al. | |
| 8,898,768 B2 | 11/2014 | Ellis | |
| 8,931,108 B2 | 1/2015 | Sharp et al. | |
| 2003/0063346 A1* | 4/2003 | Pez | H04J 14/005 398/58 |
| 2005/0133593 A1* | 6/2005 | Estakhri | G06K 17/00 235/381 |
| 2009/0089529 A1 | 4/2009 | Miranda et al. | |
| 2011/0321153 A1* | 12/2011 | Stoev | G06F 21/6245 726/16 |
| 2013/0031541 A1 | 1/2013 | Wilks et al. | |
| 2013/0070925 A1* | 3/2013 | Yamada | H04L 9/08 380/255 |
| 2013/0326582 A1* | 12/2013 | Kruzeniski | G06F 21/6209 726/2 |
| 2014/0082434 A1* | 3/2014 | Knight | G05B 19/0428 714/55 |
| 2014/0325176 A1* | 10/2014 | Messina | G06F 12/1433 711/164 |

OTHER PUBLICATIONS

Anonymous, "Data security," IP.com No. 000239586, IP.com Electronic Publication: Nov. 17, 2014, 3 pages.

Chinnakkonda Vidyapoornachary et al., "Nonvolatile Memory Data Security", U.S. Appl. No. 14/841,787, filed Sep. 1, 2015.

List of IBM Patents or Patent Applications Treated as Related, dated Sep. 28, 2015, pp. 1-2.

* cited by examiner

NONVOLATILE MEMORY DATA SECURITY

BACKGROUND

The present disclosure relates to computer memory devices, and more specifically, to data security on memory devices.

Nonvolatile memory retains its data when power is lost. Thus, data stored on nonvolatile memory may be vulnerable to unauthorized access by physical removal of a memory device containing the nonvolatile memory and insertion of the memory device in a different system.

SUMMARY

According to embodiments of the present disclosure, a method for securing nonvolatile memory data on a memory device is disclosed. The method includes generating a plurality of keys at the memory device, a period of time elapsing between generation of each key; receiving, at the memory device, a request from a memory controller for a first key, the first key a most recently generated key from the plurality of keys; communicating, by the memory device and in response to receiving the request, the first key to the memory controller; locking access to nonvolatile memory on the memory device; receiving an unlock command with a second key from the memory controller; determining the second key matches the first key; and unlocking access to the nonvolatile memory in response to determining the second key matches the first key.

Further disclosed herein are embodiments of a memory device. The memory device includes nonvolatile memory and one or more circuits configured to perform the method described above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
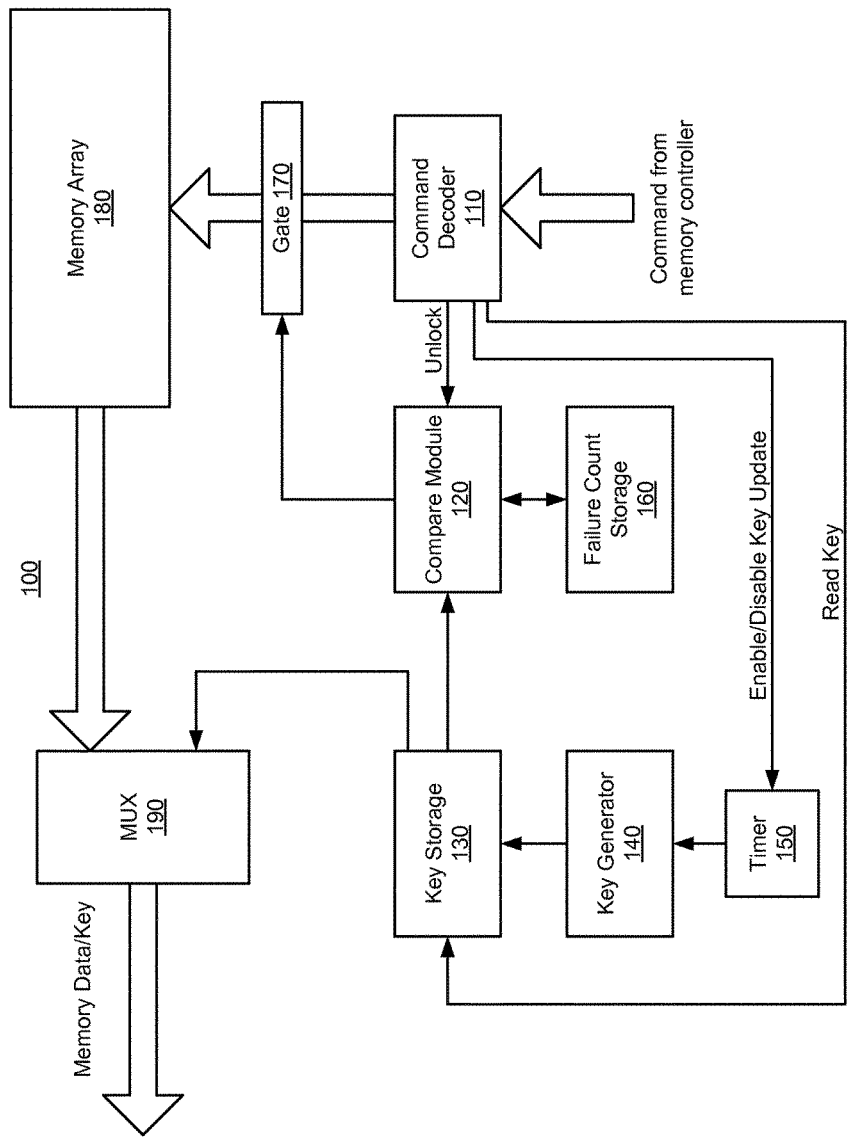
FIG. 1 depicts a block diagram of an example memory device for securing nonvolatile memory data.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to memory data security, and more particular aspects relate to securing nonvolatile memory data with a key which is periodically updated on a memory device. While the present disclosure is not necessarily limited to such applications, various aspects of the disclosure may be appreciated through a discussion of various examples using this context.

Embodiments of the present invention may provide a nonvolatile memory device with a security key that is periodically updated. The memory device may be configured to lock access to its nonvolatile memory when it is powered on. Access to the memory data may stay locked until an unlock command with a key is received from a memory controller. The memory device may unlock access to the nonvolatile memory if the received key matches a key stored on the memory device.

The memory device may be configured to periodically generate a new key after access to the memory data has been unlocked. During a shutdown procedure, the memory controller may communicate a command to stop generating new keys and may read the most recently generated key from the memory device. The memory controller may then store the key read from the memory device in local storage. The memory controller and memory device may then be powered off as part of the shutdown procedure. When the memory device is powered on from the powered off state, the memory device may be configured to start with access to the memory data locked. The memory controller may then unlock access to the memory data as described above using the key stored in the controller's local nonvolatile storage.

The key stored on the memory device may initially be set to a factory reset state such as, for example, all zero. The memory controller may be configured to use the factory reset state key until new key generation is initiated. In some embodiments, the memory controller may be configured to reset the key to its factory reset state. This may allow the memory device to be transferred to another system.

If an incorrect key is used in an attempt to unlock access to the nonvolatile memory, the memory device may keep access to the nonvolatile memory locked until a power reset occurs. Further, in some embodiments, the memory device may maintain a count of failed attempts and may lock access to the data permanently if the count reaches a threshold value.

In some embodiments, the new keys may be randomly or pseudo randomly generated on the memory device. For example, new keys may be generated using a pseudo-random binary sequence (PRBS) polynomial. In some embodiments, the method of generating new keys may be configured by a user of a computer system. For example, the user may be able to change the period of time between generation of each key or the PRBS polynomial used for generating new keys.

A timer may be configured to trigger the periodic generation of a new key. The timer may be initiated in several ways. In some embodiments, the memory device may be configured to automatically start the timer after access to the nonvolatile memory is unlocked. In some embodiments, the memory controller is configured to send a key update enable command to the memory device to initiate the timer after unlocking access to the memory.

In some embodiments, the memory device may retain one or more old keys. If the key received from the memory controller does not match the most recently generated key, the memory device may still unlock access to the nonvolatile memory if the controller key matches one of the old keys. In some embodiments, the memory device may retain the last key used to unlock access to the nonvolatile memory. This could allow for a memory controller to access the nonvolatile memory in a situation where there was an unexpected loss of power and the memory controller was unable to read the most recently generated key before the loss of power. In these embodiments, the memory device may be configured to send an alert that an old key was used to unlock access to the nonvolatile memory.

In some embodiments, the memory device may be configured to periodically request revalidation of the memory controller for additional security. Once requested, the memory device may lock access to the nonvolatile memory. The memory controller may send its locally stored key to the memory device. If the key matches an old key stored on the memory device, the memory device may unlock access to the nonvolatile memory. If the keys do not match, the access to the nonvolatile memory may remain locked.

Referring to FIG. 1, a block diagram of an example memory device 100 for securing nonvolatile memory data is depicted. Memory device 100 includes command decoder 110, compare module 120, key storage 130, key generator 140, timer 150, failure count storage 160, gate 170, memory array 180, and multiplexer (MUX) 190. Command decoder 110 may be configured to receive and decode commands from a memory controller. For example, command decoder 110 may determine whether received commands are typical commands, such as read and write commands, or, as described herein, unlock commands or key update commands.

Compare module 120 may be configured to compare a key received with an unlock command from the memory controller with a key stored in key storage 130. Compare module 120 may further be configured to unlock gate 170 if the controller key matches the key in key storage. In some embodiments, compare module 120 may further be configured to increase a failure count in failure count storage 160 if the controller key does not match the key in key storage. In some embodiments, the compare module will not unlock gate 170, regardless of whether the keys match, if the failure count is greater than a threshold amount.

Gate 170 may be configured to block access to memory array 180 when in a locked state and allow access to memory array 180 when in an unlocked state. For example, read and write commands received at command decoder 110 may be blocked by gate 170 when they are sent to memory array 180. Gate 170 may be configured to start in the locked state when the memory device is powered up. Gate 170 may then be switched to the unlocked position by compare module 120 as discussed above. Gate 170 may be implemented in various ways. For example, gate 170 may be a NAND gate, an AND gate, or an electrical switch that prevents communication of commands to memory array 180 when in the locked state.

Key generator 140 may be configured to randomly or pseudo-randomly generate keys. Timer 150 may be configured to periodically signal key generator 140 to generate a key. Timer 150 may be enabled or disabled via command from the memory controller. Keys generated by key generator 140 may be stored in key storage 130. In some embodiments, key storage 130 stores only the most recently generated key. In other embodiments, key storage 130 may also store old keys which may be used as discussed here.

Memory array 180 stores memory data. Memory array 180 may be nonvolatile memory which retains its data when power is lost. MUX 190 outputs memory data from memory array 180 based on memory controller commands. Further MUX 190 outputs the latest generated key to the memory controller in response to a command from the memory controller to read the key during a shutdown procedure.

The blocks illustrated in FIG. 1 may be implemented using one or more logic circuits configured to perform the methods discussed herein. For example, the logic circuits may be complementary metal-oxide-semiconductor (CMOS) circuits.

Figure 2:
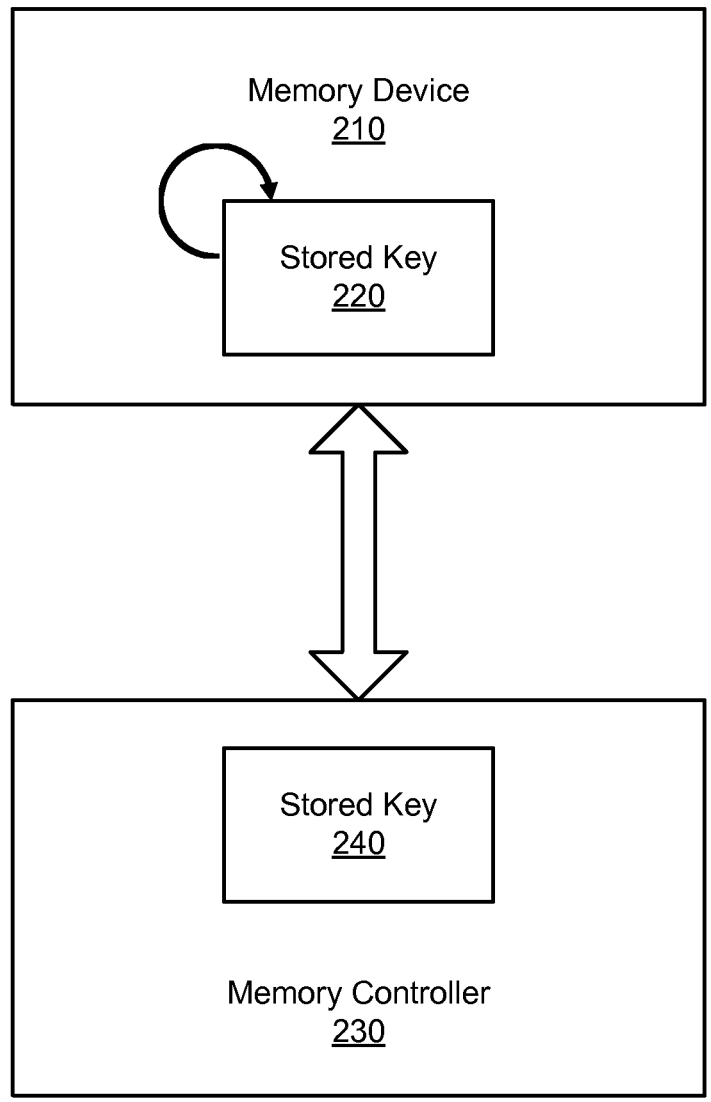
FIG. 2 depicts an example memory device and memory controller, and their associated keys, for securing nonvolatile memory data.

Referring to FIG. 2, an example memory device 210 and memory controller 230, and their associated keys, for securing nonvolatile memory data are depicted. Memory device 210 has stored key 220 which is periodically updated as illustrated by the circular arrow. Memory controller 230 contains a stored key 240. During a shutdown procedure, memory controller reads stored key 220 from memory device 210 and stores it as stored key 240. When memory controller 230 and memory device 210 are powered on, memory controller 230 may communicate an unlock command with stored key 240 to memory device 210 to unlock the device.

Figure 3:
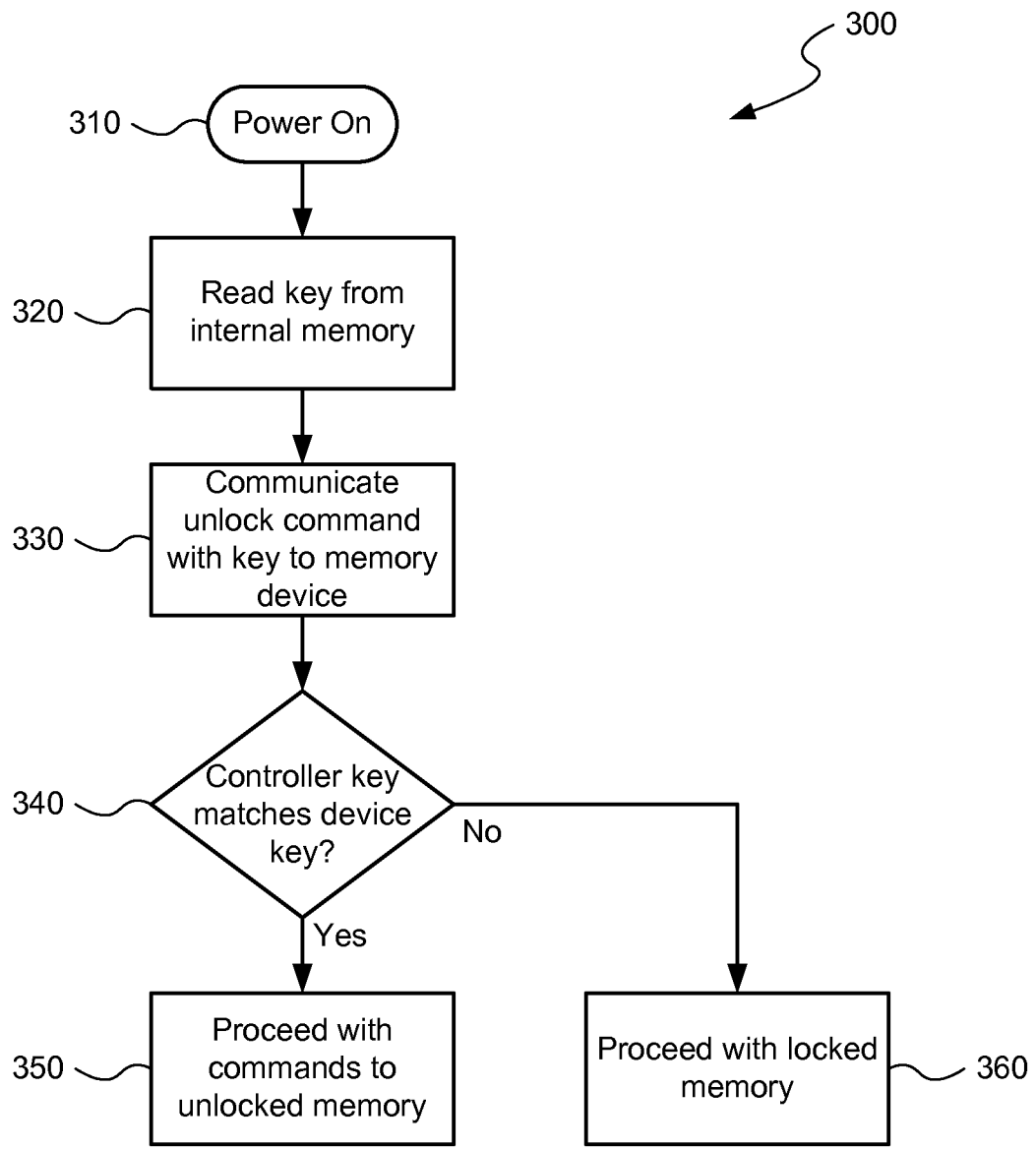
FIG. 3 depicts a flow diagram of an example method for a memory controller unlocking access to nonvolatile memory on a memory device.

Referring to FIG. 3, a flow diagram of an example method 300 for a memory controller unlocking access to nonvolatile memory on a memory device is depicted. Method 300 begins at block 310 when the memory controller is powered on. At block 320, the memory controller reads a key from its internal memory. At block 330, the controller communicates an unlock command along with the key to a memory device. At block 340, it is determined whether the key from the controller matches the key on the memory device. If the keys match, the memory controller may proceed normally with commands to the unlocked memory device at block 350. If the keys do not match, the memory controller may proceed with the memory device locked at block 360. In some embodiments, the memory controller and memory device may require a power reset to attempt another unlock command.

Figure 4:
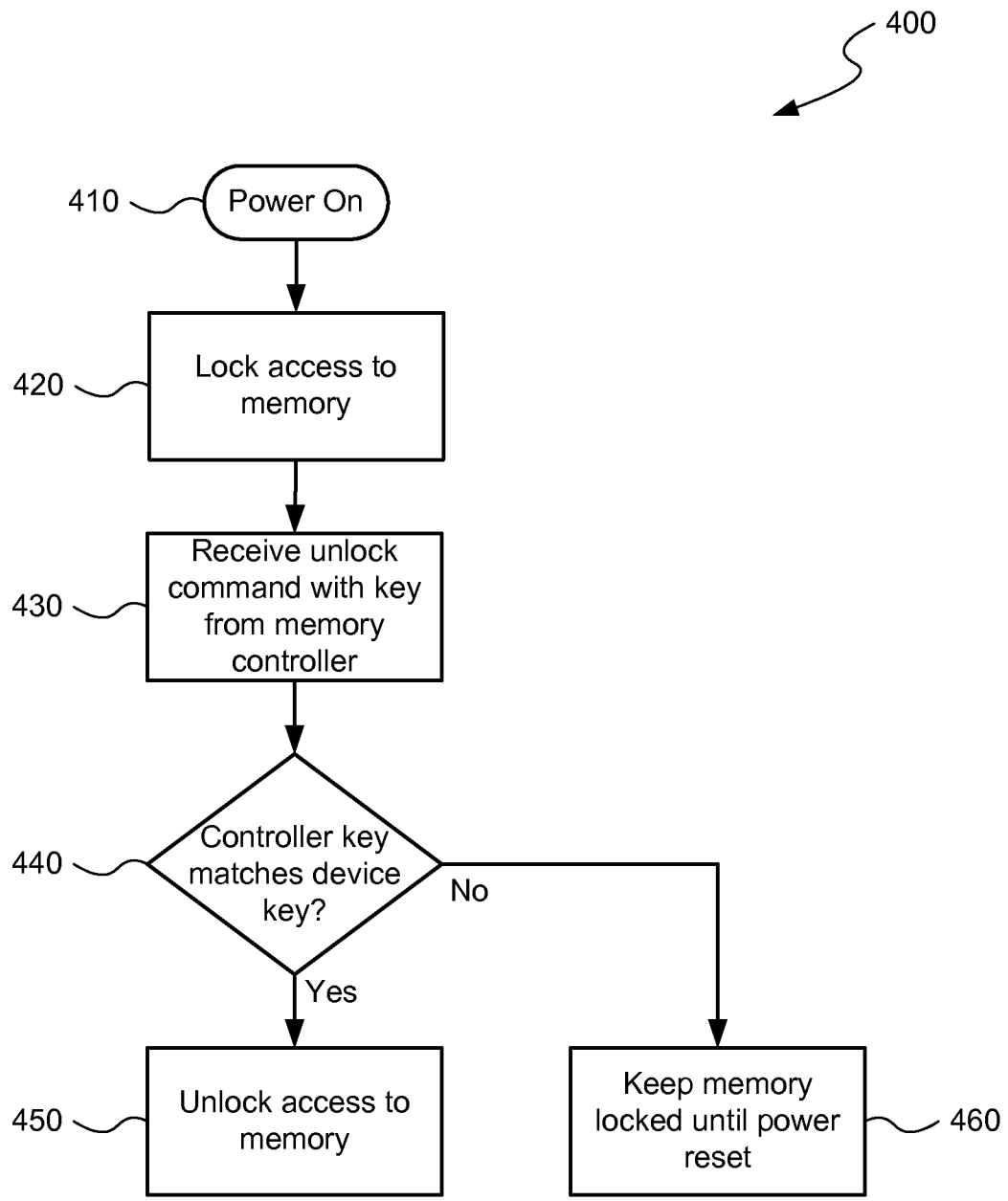
FIG. 4 depicts a flow diagram of an example method for unlocking access to nonvolatile memory on a memory device.

Referring to FIG. 4, a flow diagram of an example method 400 for unlocking access to nonvolatile memory on a memory device is depicted. Method 400 begins a block 400 when the memory device is powered on. At block 420, the memory device locks access to nonvolatile memory on the device. At block 430, the memory device receives an unlock command with a key from a memory controller. At block 440, the memory device determines whether the key received from the memory controller matches a key stored on the memory device. If the keys match, the memory device unlocks access to the nonvolatile memory at block 450. If the keys do not match, the memory device may keep the access to the nonvolatile memory locked until a power reset occurs at block 460.

Figure 5:
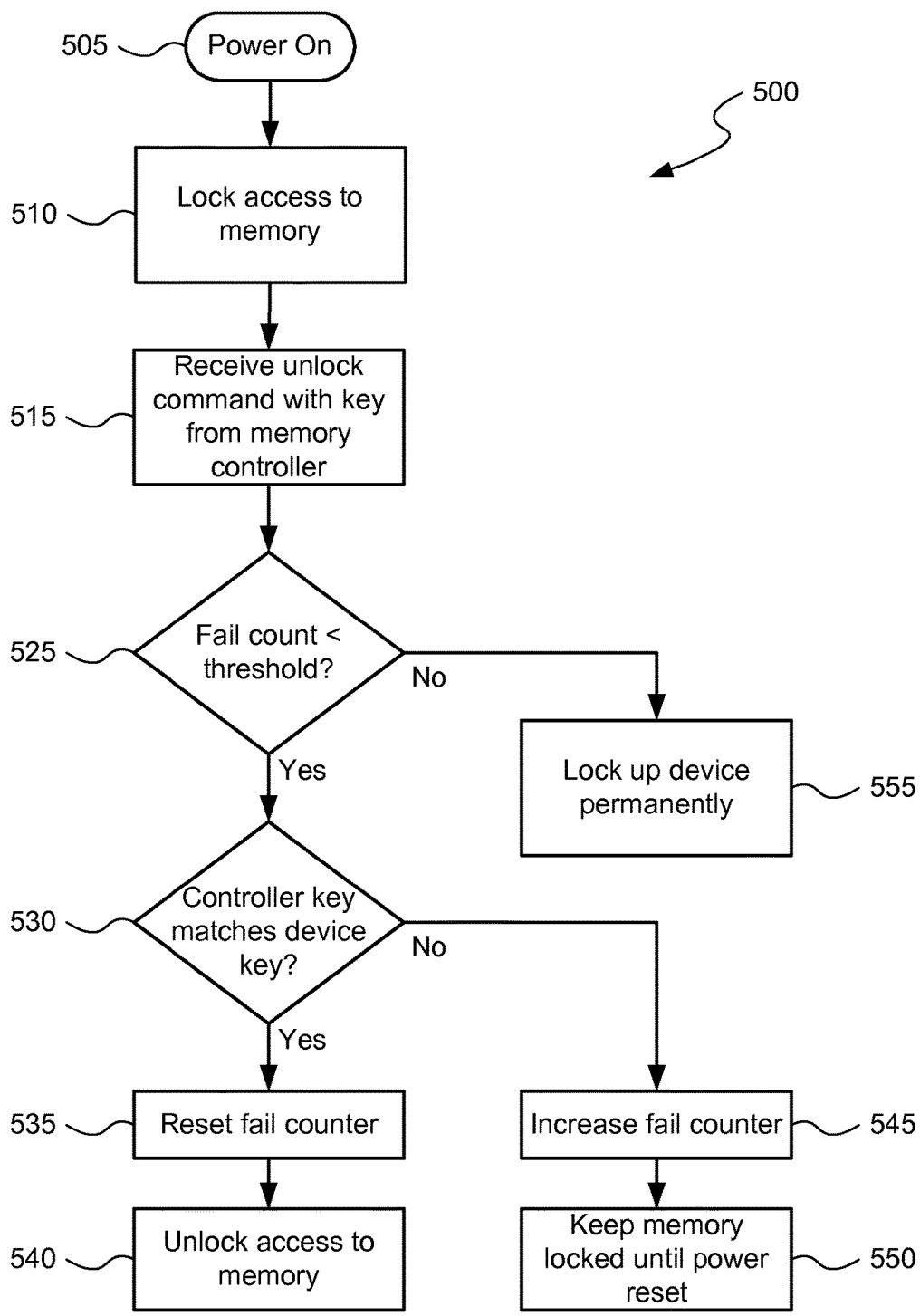
FIG. 5 depicts a flow diagram of a second example method for unlocking access to nonvolatile memory on a memory device.

Referring to FIG. 5, a flow diagram of a second example method 500 for unlocking access to nonvolatile memory on a memory device is depicted. Method 500 begins at block 505 when the memory device is powered on. At block 510 the memory device locks access to nonvolatile memory on the device. At block 515, the memory device receives an unlock command with a key from a memory controller. At block 525, the memory device determines whether a fail count is less than a threshold. If the fail count is not less than the threshold, the memory device permanently locks up the nonvolatile memory at block 555. If the fail count is less than the threshold, the memory device determines whether the key received from the controller matches a key stored on the memory device at block 530. If the keys match, the memory device resets the fail counter, at block 535, and unlocks access to the nonvolatile memory at block 540. If the keys do not match, the memory device increases the fail counter, at block 545, and keeps the access to memory locked until power reset at block 550.

Figure 6:
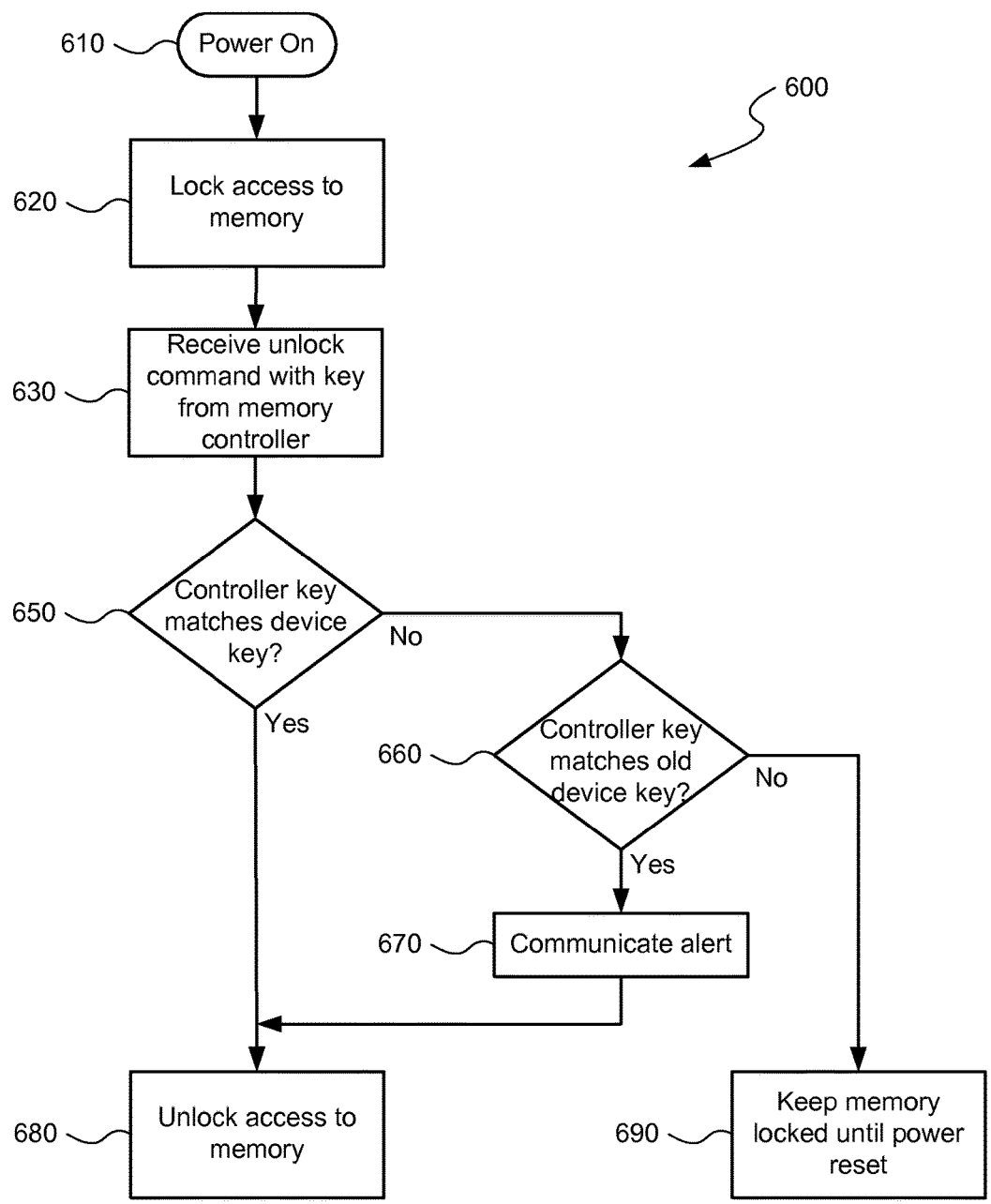
FIG. 6 depicts a flow diagram of a third example method for unlocking access to nonvolatile memory on a memory device.

Referring to FIG. 6, a flow diagram of a third example method 600 for unlocking access to nonvolatile memory on a memory device is depicted. Method 600 begins, at block 610, when the memory device is powered on. At block 620, the memory device locks access to nonvolatile memory on the device. At block 630, the memory device receives an unlock command with a key from a memory controller. At block 650, the memory device determines whether the key received from the memory controller matches a key stored on the memory device. If the keys match, the memory device unlocks access to the nonvolatile memory at block 680. If the keys do not match, the memory device may determine whether the key received from the controller matches an old key stored on the memory device at block 660. If the key received from the controller matches an old key, the memory device may communicate an alert, at block 670, and unlock access to the nonvolatile memory at block 680. The alert may indicate to a user that an old key was used to unlock access to the nonvolatile memory. If the key received from the controller does not match an old key, the memory device may lock up access to the nonvolatile memory until a power reset at block 690.

Figure 7:
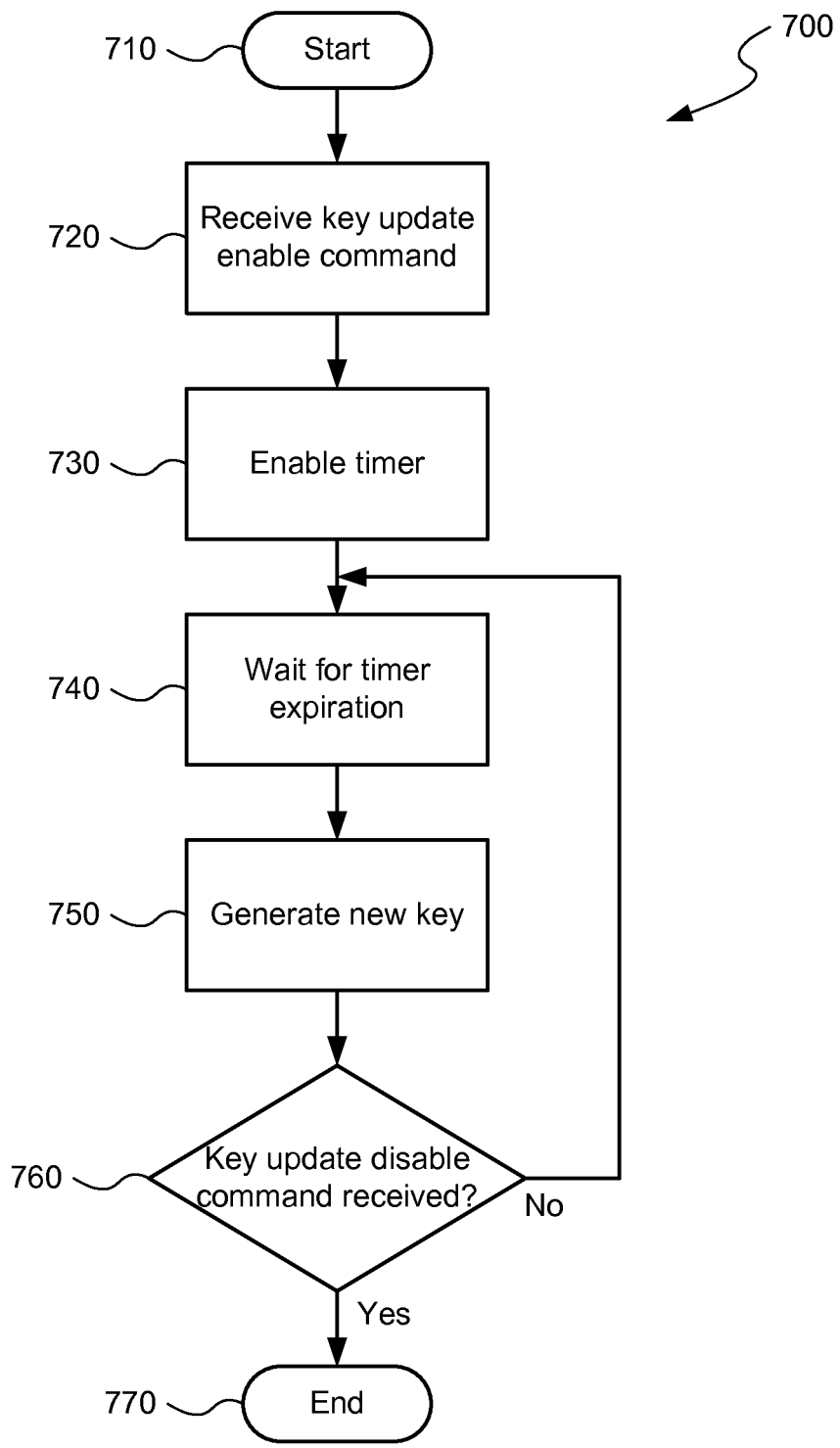
FIG. 7 depicts an example method for periodically generating new keys by a memory device.

Referring to FIG. 7, a flowchart of an example method 700 for periodically generating new keys by a memory device is depicted. Method 700 begins at block 710. At block 720, a key update enable command is received from a memory controller. The memory controller may send this command after successfully unlocking access to nonvolatile memory on the memory device. At block 730, a timer is enabled. At block 740, the memory device waits for expiration of the timer. At block 750, the memory device generates a new key. At block 760, the memory device determines whether a key update disable command has been received. If a key update disable command has been received, the memory device stops generating new keys and method 700 ends at block 770. If a key update disable command has not been received, the memory device waits for the next expiration of the timer at block 740.

Figure 8:
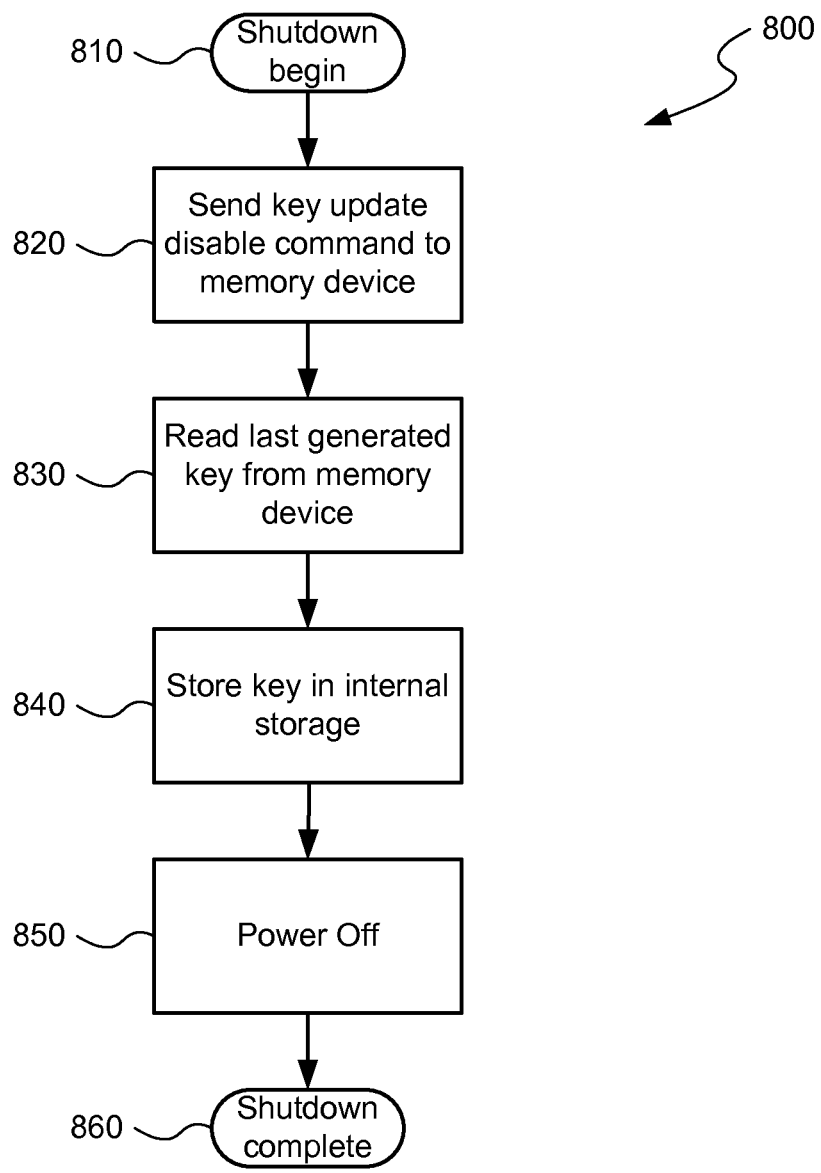
FIG. 8 depicts an example method for a memory controller retrieving a key from a memory device.

Referring to FIG. 8, a flowchart of an example method 800 for a memory controller retrieving a key from a memory device is depicted. Method 800 begins at block 810 when a shutdown procedure begins. At block 820, the memory controller communicates a key update disable command to the memory device that is configured to cause the memory device to stop generating new keys. At block 830, the memory controller reads the most recently generated key from the memory device. At block 840, the memory controller stores the key in internal storage. At block 850, the memory controller is powered off. Method 800 ends with the completion of the shutdown procedure at block 860.

Figure 9:
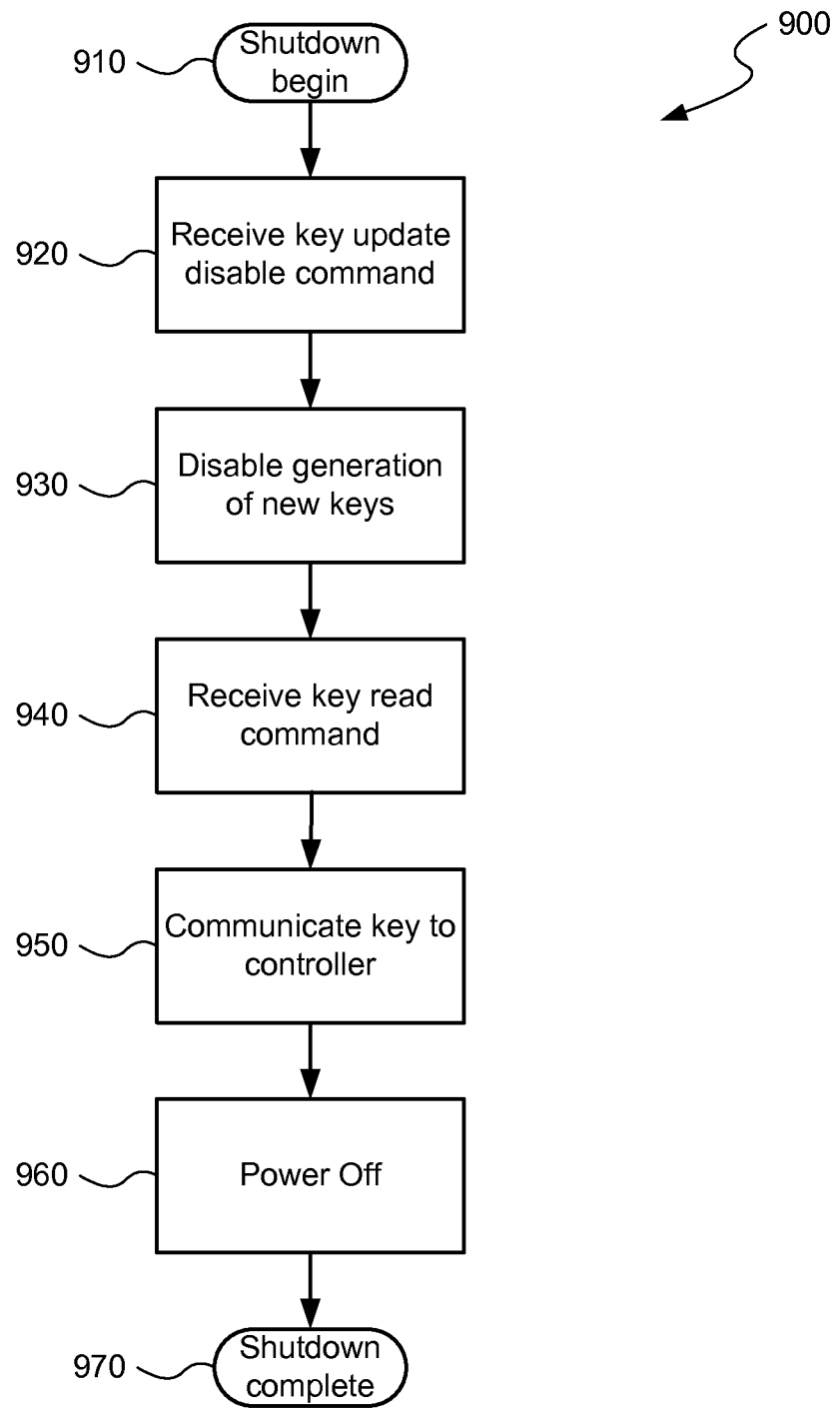
FIG. 9 depicts an example method for a memory device communicating a key to a memory controller.

Referring to FIG. 9, a flowchart of an example method 900 for a memory device communicating a key to a memory controller is depicted. Method 900 begins at block 910 when a shutdown procedure begins. At block 920, the memory device receives a key update disable command from a memory controller. At block 930, the memory device disables the generation of new keys. At block 940, the memory device receives a key read command from the memory controller. At block 950, the memory device communicates the most recently generated key to the memory controller. At block 960, the memory device is powered off. Method 900 ends at block 970 with the completion of the shutdown procedure.

Figure 10:
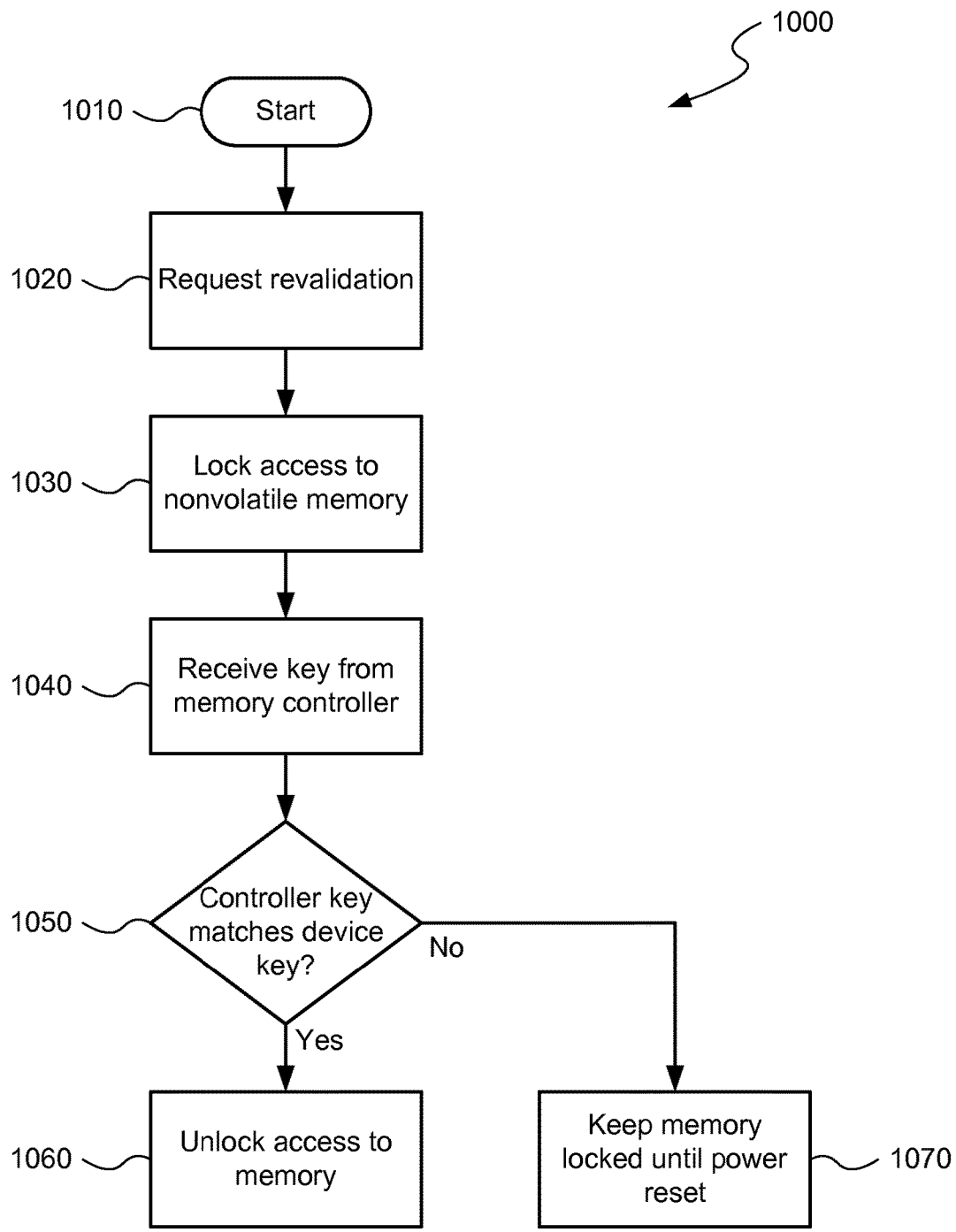
FIG. 10 depicts a flowchart of an example method for a memory device revalidating a memory controller.

Referring to FIG. 10, a flowchart of an example method 1000 for a memory device revalidating a memory controller is depicted. At block 1010, method 100 starts. Method 1000 may be initiated after a specified period of time has elapsed since access to nonvolatile memory on the memory device was unlocked. At block 1020, the memory device requests revalidation from the memory controller. At block 1030, access to the nonvolatile memory is locked. At block 1040, a key is received from the memory controller. At block 150, the memory device determines whether the controller key matches a key stored on the memory device. In this case, the key stored on the memory device may be the key which was last used to unlock access to the nonvolatile memory. If the keys match, the memory device unlocks access to the nonvolatile memory at block 1060. If the keys do not match, the memory device keeps the memory locked until a power reset occurs at block 1070.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for securing nonvolatile memory data on a memory device, the method comprising:
generating, by the memory device, a plurality of keys, a period of time elapsing between generation of each key;
receiving, by the memory device while access to the nonvolatile memory is unlocked, a request from a memory controller for a first key, the first key is a most recently generated key from the plurality of keys;
communicating, by the memory device and in response to receiving the request while access to the nonvolatile memory is unlocked, the first key to the memory controller;
locking, by the memory device and after the communicating the first key to the memory controller, access to nonvolatile memory on the memory device;
receiving, at the memory device, an unlock command with a second key from the memory controller;
determining, by the memory device, the second key matches the first key; and unlocking, by the memory device, access to the nonvolatile memory in response to the determining the second key matches the first key.

2. The method of claim 1, wherein the locking access to the nonvolatile memory occurs in response to the memory device being powered on from a powered off state.

3. The method of claim 1, further comprising:
requesting, by the memory device, revalidation of the memory controller;
locking, by the memory device, access to the nonvolatile memory in response to the requesting revalidation;
receiving, by the memory device, a third key from the memory controller in response to the requesting revalidation of the memory controller;
determining, by the memory device, the third key matches the first key; and
unlocking, by the memory device, access to the nonvolatile memory in response to the determining the third key matches the first key.

4. The method of claim 1, wherein the keys are generated using a pseudo-random binary sequence polynomial.

5. The method of claim 1, further comprising:
initiating, by the memory device, a timer, wherein the timer triggers the generating the plurality of keys.

6. The method of claim 5, further comprising:
receiving, by the memory device, a key update enable command, wherein the initiating the timer occurs in response to the receiving the key update enable command.

7. The method of claim 1, further comprising
generating, by the memory device and after the unlocking access to the nonvolatile memory in response to the determining the second key matches the first key, a second plurality of keys, a third key is a most recent generated key from the second plurality of keys;
storing, by the memory device, the first key in an old key storage;
locking, by the memory device, access to the nonvolatile memory after the generating the second plurality of keys;
receiving, by the memory device, a second unlock command with the second key;
determining, by the memory device, the second key does not match the third key;
determining, by the memory device, the second key matches the first key in the old key storage; and
unlocking, by the memory device, access to the nonvolatile memory in response to the determining the second key matches the first key in the old key storage.

8. The method of claim 7, further comprising:
communicating, by the memory device an alert, the alert indicating the nonvolatile memory was unlocked using an old key.

9. The method of claim 1, further comprising:
generating, by the memory device, after the unlocking access to the nonvolatile memory in response to the determining the second key matches the first key, a second plurality of keys at the memory device, a third key is a most recent generated key from the second plurality of keys;
storing, by the memory device, the first key in an old key storage;
locking, by the memory device, access to the nonvolatile memory after the generating the second plurality of keys;
receiving, by the memory device, a second unlock command with a fourth key;
determining, by the memory device, the fourth key does not match the third key;
increasing, by the memory device, a fail counter in response to the determining the fourth key does not match the third key;
determining, by the memory device, the fail counter has reached a threshold value; and
permanently locking, by the memory device, access to the nonvolatile memory in response to the determining the fail counter has reached a threshold value.

10. The method of claim 1, wherein the second key is not encrypted when received from the memory controller.

11. The method of claim 1, wherein locking access to the nonvolatile memory comprises configuring a gate to block read and write commands from being communicated to the nonvolatile memory.

12. The method of claim 6, further comprising:
receiving a key update disable command from the memory controller; and
stopping the generation of new keys in response to receiving the key update disable command.

* * * * *